United States Patent

[11] 3,563,143

| [72] | Inventor | Christian C. Petersen |
| | | Westwood, Mass. |
| [21] | Appl. No. | 742,431 |
| [22] | Filed | July 3, 1968 |
| [45] | Patented | Feb. 16, 1971 |
| [73] | Assignee | Polaroid Corporation |
| | | Cambridge, Mass. |

[54] EXPOSURE CONTROL SYSTEM FOR DOCUMENT COPYING APPARATUS
19 Claims, 3 Drawing Figs.

[52] U.S. Cl...................................................... 95/10,
250/209, 317/127, 355/68, 356/222
[51] Int. Cl......................................................... G03b 7/08,
G03b 9/62
[50] Field of Search........................................... 95/10C;
355/68; 250/208, 209; 317/128, 148.5; 356/221, 222

[56] References Cited
UNITED STATES PATENTS
| 3,205,799 | 9/1965 | Burgarella et al.............. | 95/10(C) |
| 3,310,679 | 3/1967 | Babish........................... | 250/209 |

*Primary Examiner*—John M. Horan
*Assistant Examiner*—Joseph F. Peters, Jr.
*Attorney* — Brown and Mikulka and William D. Roberson and Gerald L. Smith

ABSTRACT: An exposure control system for document duplicating devices which utilizes a multibranch photosensing network to evaluate variations in reflection characteristics over select portions of a document to be duplicated. The embodiment shows an adjustment of exposure interval timing in correspondence with a reflection evaluation representing the brightest portion of the duplicated document.

INVENTOR.
Christian E. Petersen

BY Brown and Mikulka
and
Gerald L. Smith
ATTORNEYS

3,563,143

EXPOSURE CONTROL SYSTEM FOR DOCUMENT COPYING APPARATUS

This invention relates to exposure control systems and, more particularly, to exposure control instrumentation for use with document duplication devices and the like utilizing photosensitive recording media.

BACKGROUND OF THE INVENTION

The field of document duplication has evolved a progression of performance criteria which serve to objectively define the qualities desired in a reproduction. Important among these qualities are the provision of a properly toned background; the development of good contrast between that background and informational characters which are printed or otherwise disposed over the background; and the furnishing of an adequate range of tones above that of the background for recording the appearance of more complex information as found in pictures and the like.

Conventional photographic processes have been considered suitably adaptable for use in the field of document duplication, particularly with regard to the provision of a broad tonal range for reproducing complex figures. However, a control of the above noted background tone has been observed to pose technical difficulties. These difficulties stem largely from the nature of the conventional photographic technique, which strives to somewhat accurately recreate the appearance of original subjects and scenes upon a photosensitive medium such as film. To achieve this appearance, the relative brightness of each of a myriad of luminous aspects within the photographic scene are reproduced on the photosensitive medium as a variation of tones. These tones are present as reflection densities, the range of which is delimited by the sensitometric latitude of the photosensitive material used. Generally, a photographer will derive a suitable picture by causing an image to be formed from any of a variety of tonal subregions within this latitude of film density range.

Photocopies of documents reproduced using these conventional approaches may be accurate and acceptable under normal photographic tone reproduction criteria but not acceptable under the standards of the document copying industry. Should the background of the original document be tinted or formed of a relatively nonreflective material, it may reappear in the photocopy as a shade of gray. Such backgrounds generally are considered to mar the readability of the copy as well as produce an aesthetically undesirable overall effect. To meet a standard of readability and aesthetic quality, the background of the photocopy should be adjusted toward a white tone while the informational characters or symbols printed or otherwise positioned over the face of the document must be reproduced against the white background in an adequately contrasting or dark tone. The photographic exposure setting achieving this adjustment necessarily entails an accurate evaluation of the reflection densities of the background structure of the original document. Further, the exposure adjustment represents a departure from typical photographic technique. Where darker toned backgrounds or those having relatively lower reflection densities are encountered, the exposure valuation must be selected so as to reproduce the background in an exaggerated light or white tone. This requisite selection limits the flexibility of exposure adjustments which may otherwise be available by virtue of the sensitometric latitude of the copying film.

To provide exposure control instrumentation for use with photographic document duplicating devices, recourse may be made to the use of a singular exposure valuation adjusted to provide good copies of the most characteristically encountered documents. While the simplicity and consequent low unit cost of such instrumentation is highly desirable, it fails to exploit the otherwise broadened performance capacity or sensitometric latitude of the photosensitive recording medium. Document copying devices incorporating such instrumentation suffer a loss of desirable versatility for providing acceptable copies of documents having not only white and reflective backgrounds but also those which are colored or tinted and those having mat surfaces of low reflection density. It follows that a simple but automated form of exposure adjustment instrumentation would be desirable for incorporation within duplicating machines, in order to accommodate variations in the surface characteristics of documents.

The photographic industry has evolved a variety of automated exposure control systems for cameras which function effectively over the scene-lighting conditions encountered in general photographic practice. These systems are structured so as to perform an initial measurement of scene brightness from which measurement a signal is formed. This light representative signal is then translated into a corresponding exposure value to which a camera adjustment is conformed. The lighting evaluation of the scene is provided by a circuit utilizing a photosensitive element which is aligned in a manner wherein it is responsive to the overall light characteristics of a scene somewhat coincident with that of the field of view of the camera lens system. Photosensitive elements suited for use with the sensing system are characterized in having electrical conductivities varying reproduceably with the intensity of light impinging upon them. The signals derived from circuits incorporating the elements represent a value of light intensity or brightness integrated over the entire scene which they witness. This integrated value of light is then a basis of measurement from which an exposure value is derived. Should highlights be present in the scene witnessed, the luminance value of these aspects will be added into an overall integrated brightness valuation. The valuation thus derived, however, is not appropriate for the task at hand inasmuch as it does not adequately discern and evaluate the reflective qualities of document background. As a consequence, the overall scene light integrating techniques of prior art contribute only marginal improvement to duplicator exposure instrumentation systems by their accommodations to the vagaries of artificial lighting systems.

SUMMARY OF THE INVENTION

The invention now presented provides an exposure control system for document duplicating devices or the like which has the capability of discerning the background reflection characteristics of documents and similar items. Upon determining these background characteristics, the system functions to derive an exposure valuation suited for forming photocopies having desirably white backgrounds while maintaining proper line copy contrast. These white backgrounds are produced by the system of the invention for all of a broad variety of document forms, including those incorporating originally colored, toned or mat surfaces.

The system is further characterized in providing photocopies having light or white backgrounds while still permitting a reproduction having a relatively broad tonal distribution. As a consequence, the invention permits a more efficient and practical utilization of the dynamic ranges available in photosensitive copying materials.

In providing a desired sensitivity to document background characteristics, the present system utilizes a plurality of photosensing elements, each of which functions to derive a photometric measurement made over a select portion of a document being duplicated. The brightness or reflection density evaluations thusly derived are scrutinized by the circuitry of the invention in a manner providing for the selection and use of a value representing background characteristics.

In effecting this unique scrutinization and selection procedure, the control system of the invention provides a sensing network formed having a plurality of branches, each responsive to the reflection density at a select region upon the surface of a document to be copied. Each of the evaluating branches is formed having at least one photoconductive element responsive to reflection density and arranged with capacitor means to provide an R-C exposure interval timing circuit. The photoconductive elements may be of a variety termed "light dependent resistors" or "LDR's." These elements are generally fabricated of materials such as selenium, cadmium sulfide, lead sulfide and the like and are characterized in having electrical conductivities varying reproduceably with the intensity of light impinging upon them.

Through the incorporation of discrete unilaterally conductive means with evaluating branches, a logic arrangement is derived which advantageously functions to select the output of that branch appropriate for gauging the effect of background reflection density. The branch so selected is that responding to the surface of highest brightness.

The invention is further characterized in the provision of a simple and straightforward incorporation of the aforedescribed photosensing and logic circuitry with an elementary form of capping blade shutter mechanism. As a result, the exposure control system of the invention is readily insertable within a wide selection of relatively low cost document duplicating devices.

As another feature of the invention, the photosensing and logic circuitry of the invention may be used with field effect transistor devices, thereby permitting its fabrication with relatively few electronic components.

In addition to the foregoing, the objects of the invention include the provision of an exposure control system for document duplicating devices adapted to derive an exposure value responsive to a photometric evaluation of a portion of a document having none or relatively few informational characters imprinted thereon and to adjust the exposure interval timing in correspondence with that evaluation.

Other objects of the invention will in part be obvious and will in part appear hereinafter.

The invention, accordingly, comprises the apparatus, system and method possessing the features, techniques and properties which are exemplified in the description to follow hereinafter.

For a fuller understanding of the nature and objects of the invention, reference should be made to the following detailed description taken in connection with the accompanying drawings.

DETAILED DESCRIPTION OF THE DRAWINGS

The general structure of the exposure control system of the invention incorporates an exposure interval timing network which is formed having a plurality of R-C timing branches. Each of these branches functions in mutual independence and are formed having at least one photocell which serves as the resistance component of the timing branch. The respective photocells are each pointed at different regions of the document to be duplicated. Depending upon the chance format of the item to be copied, certain of these regions will carry printed matter; others, line characters or more complex information; while others may encompass more complex information such as pictorial matter. However, through a predetermined selection of the number of photocells or timing branches and through studied selection of their orientation and consequent field of influence, at least one of the photocells will be predominantly influenced by the reflection characteristics of the document background. The circuitry of the invention will select the output of the R-C timing branch having this photocell as a resistor component. This output is then utilized to time the exposure interval of a simple shutter mechanism.

The circuitry of this invention additionally includes means to provide a timing factor adjustment which is initially superimposed over the timing network. This adjustment serves to conform the network with the sensitometric property of the photosensitive material upon which the document is duplicated. The adjustment provided is selected in a manner wherein that portion of the document image receiving heaviest exposure will be recorded as a white color upon a photographically positive medium. Those versed in the photographic art will recognize that this region of exposure representing maximum reflection will lie within the toe portion or very near the lower inflection point of a typical H. and D. curve relating density as a function of the log of exposure. It follows that the informational characters upon the original document will then be recorded photographically at densities above that point. In effect, the lightest or white background portion of the resultant copy will be "clampled" at the density value or point representing white background. The exposure range or latitude of the photosensitive medium or film along with its contrast or gamma characteristic will determine the extent of tone distribution across the photographic reproduction.

Figure 1:
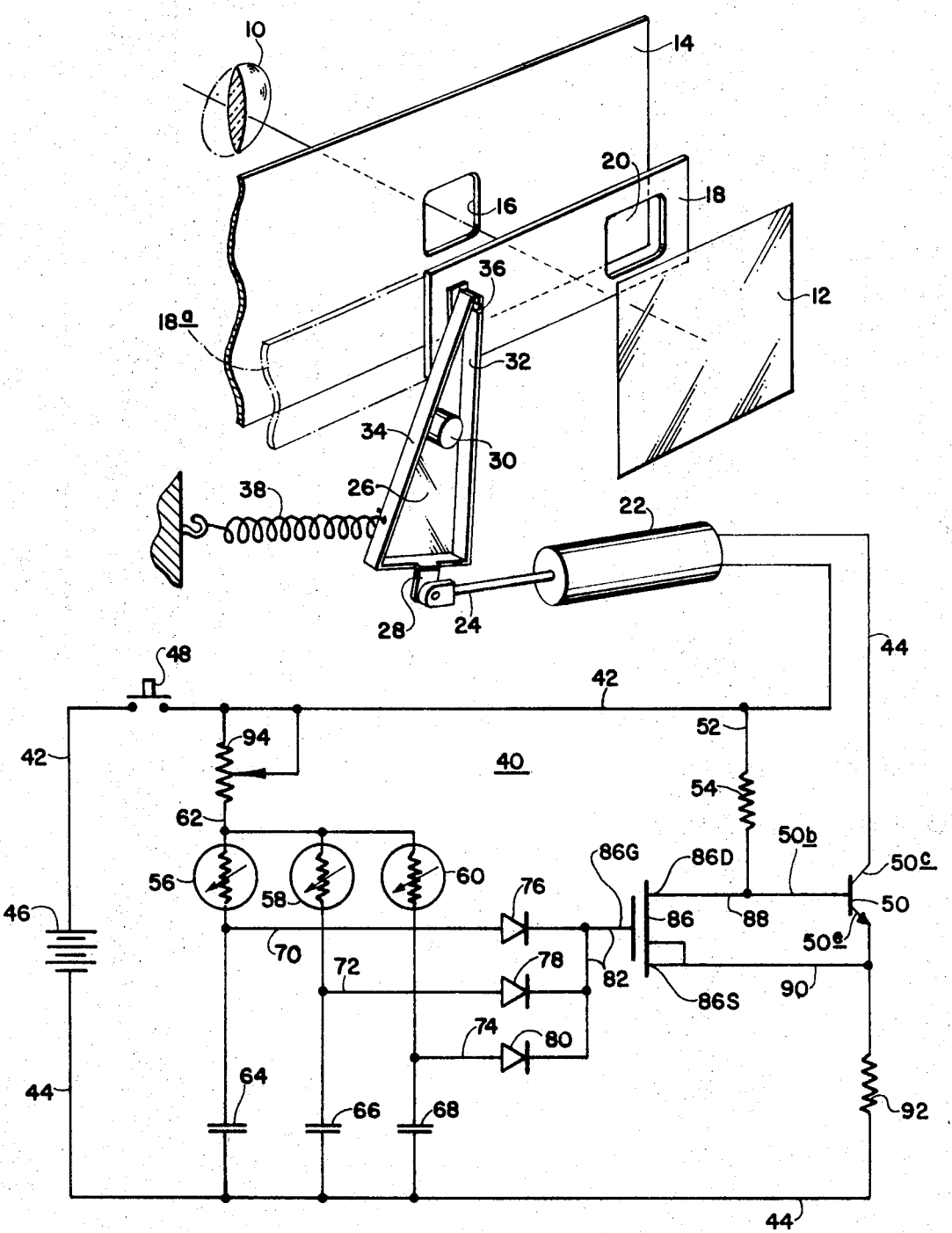
FIG. 1 is a schematic electrical diagram of one embodiment of the present invention shown in conjunction with a pictorial and exploded representation of an automated shutter device for document copying systems.

Referring to FIG. 1, circuitry for an exposure control system according to the invention is depicted in conjunction with a solenoid actuated shutter mechanism of a variety suited for document duplicating devices. In the schematic portrayal of the shutter arrangement, a copying lens 10 functions to project the image of an artificially illuminated document onto the surface of a photosensitive sheet 12. Shutter components are positioned at an optically appropriate location along the optical axis of the system. The shutter is shown having a base plate 14. An exposure aperture 16 is formed within this base plate in alignment with the optical axis of the system. Supported for translational movement across the aperture 16 is a shutter blade 18 incorporating another aperture opening 20. The blade 18 is illustrated in an orientation wherein the shutter is closed by virtue of the imposition of a blank portion of the blade over the base plate aperture 16. When the shutter assumes an open status, the blade 18 is moved laterally to the position shown partially in phantom wherein its aperture 20 is aligned in registry with the base plate aperture 18.

To cause an opening of the shutter, a solenoid 22 having a normally extended armature 24 is energized by the control circuitry of the system so that armature 24 is suddenly drawn into the solenoid. This movement causes a lever-type linkage to appropriately reposition blade 18. Looking to this linkage in more detail, the armature 24 is pivotally connected to lever or carriage 26 and an offset extension 28 thereof. Lever 26 is rotatably mounted upon a pivot 30 and is formed incorporating a pair of resilient leaf spring arms 32 and 34. Arms 32 and 34 serve to cushion the shutter blade 18 while imparting lateral movement to it by virtue of a slidable connection with a cantilever pin 36 connected to and extending from the blade.

Following an appropriate exposure interval as determined by the timing and sensing circuitry, the solenoid 22 is deenergized. This deenergization permits a helical return spring 38 to impart a movement to the lever 26 which causes the blade 18 to move laterally to a closed status.

From the foregoing description it will be observed that the shutter mechanism is of a simple variety suited for operating in rapid succession over extended periods. The shutter mechanism is characterized in being open as long as the solenoid 22 is energized, and closed as the solenoid 22 is deenergized.

Control of the energization interval of the solenoid 22 is provided by the photosensing and timing system of the invention, a circuitry embodiment for which is indicated generally at 40. Power is supplied from the exposure interval timing system 40 to energize solenoid 22 through leads shown at 42 and 44. These leads, in turn, are connected with a suitable power source which, for illustrative purposes, is indicated as a battery 46. The exposure is commenced upon closure of a switch 48. Closure of switch 48 simultaneously causes a forward biasing of the transistor 50 inserted in lead 44. The forward biased status of transistor 50 is realized as a result of current introduced through line 52 and base biasing resistor 54 to its base electrode 50$b$. Since the collector and emitter electrodes shown respectively at 50$c$ and 50$e$ are coupled in switching fashion across lead 44, the forward biased status of transistor 50 permits current flow through lead 44 and consequent energization of solenoid 22. Solenoid 22 will remain energized until the forward bias at the base of transistor 50 is removed. Switch 48 is arranged so as to be held closed throughout the interval of an exposure. A variety of switching arrangements are readily available which incorporate this holding function.

As solenoid 22 is energized, exposure interval timing commences. The timing function of the circuit is shown to include three photoconductors or light dependent resistors 56, 58 and 60. These photoconductors are mounted at predetermined positions upon the duplicating device so that each is influenced by and responds to a distinct region of the document to be copied. Alternately, the photoconductors may be positioned to point toward select regions of the projected image of the document. Preferably, at least one of these regions will encompass a substantial portion of the blank background border area of a typical document. It will be apparent that any number and arrangement of photoconductors may be used with the instant system depending upon the number of discrete photometric reflection evaluations desired.

The photoconductors 56 to 60 are of the variety whose conductivities increase as they are exposed to increasing amounts of light and are shown connected to the potential of source 46 from a line 62. Each of the photoconductors 56 to 60 respectively form one leg of a corresponding branch of a timing network. The remaining leg of each branch is formed respectively of capacitors 64, 66 and 68, all of which are equally rated. The capacitors 64 to 68 are connected into the opposite terminal of the battery source 46 from along lead 44. Each R-C timing branch is tapped respectively by lines 70, 72 and 74 which function to impress the voltage built up within each of the branches across unilaterally conductive diodes shown respectively at 76, 78 and 80. The cathode electrodes of each of the diodes 76 to 80 are shown interconnected by a line 82.

The voltage output ultimately derived along line 82 from the timing network will be impressed upon the gate 86$_G$ of a field effect transistor 86. This transistor is illustrated having its drain electrode 86$_D$ and source electrode 86$_S$ coupled through respective lines 88 and 90 across the base-emitter junction of transistor 50. With this coupling arrangement, the field effect transistor 86 functions as a bypass switch for energizing or deenergizing the transistor 50. In this regard, the forward biasing current existent at the base 50$b$ of transistor 50 will be shunted through field effect transistor 86 upon receipt by transistor 86 of a gating voltage of proper value from line 82. A resistor 92 is inserted in line 44 to enhance a regenerative effect thereby improving the triggering sensitivity of the field effect transistor 86.

Figure 2:
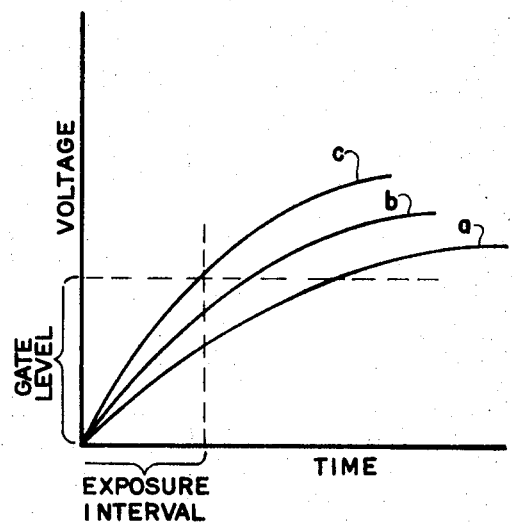
FIG. 2 illustrates a series of curves depicting capacitor charge rates typically encountered in the control system of the invention.

The photosensitive timing network commences to function at the instant the shutter mechanism is opened. At this point in time, each of the photoconductors 56, 58 and 60, independently, will assume a value of resistance representative of the magnitude of light impinging upon it from its respective region of influence. The branch capacitor which is coupled with each of these photoconductors will commence to charge at a rate determined by the value of resistance developed in the photoconductor. Referring to FIG. 2, the charging rates for three timing branches are illustrated at curves $a$, $b$, and $c$. That timing branch whose photoconductor is receiving the highest magnitude of light will charge more rapidly than the others, for instance as is indicated by the slope of curve $c$. This curve will reach a predetermined gate level voltage serving to terminate the exposure interval before such level is reached by the other branches. Returning to FIG. 1, it will be seen that by virtue of the cathode interconnections of diodes 76, 78 and 80, that diode whose timing branch is undergoing the most rapid charge rate will function to back bias the remaining diodes from along line 82. This back biasing reaction will function to isolate all but that timing branch receiving the highest intensity of light. The period required for this branch to achieve a gating voltage triggering field effect transistor 86 into conduction will represent the exposure interval. As this voltage is impressed upon gate electrode 86$_G$, the forward biasing current at base 50$b$ of transistor 50 will be shunted through transistor 86. Transistor 50 will switch to a nonconductive state and solenoid 22 will be deenergized, thereby causing the shutter mechanism to return to a closed position.

The sensitivity of the entire timing network may be regulated by adjusting the variable resistor 94 coupled in series with the network. This adjustment may be used to conform the network with the sensitometric property of the photosensitive material upon which a document is duplicated.

Figure 3:
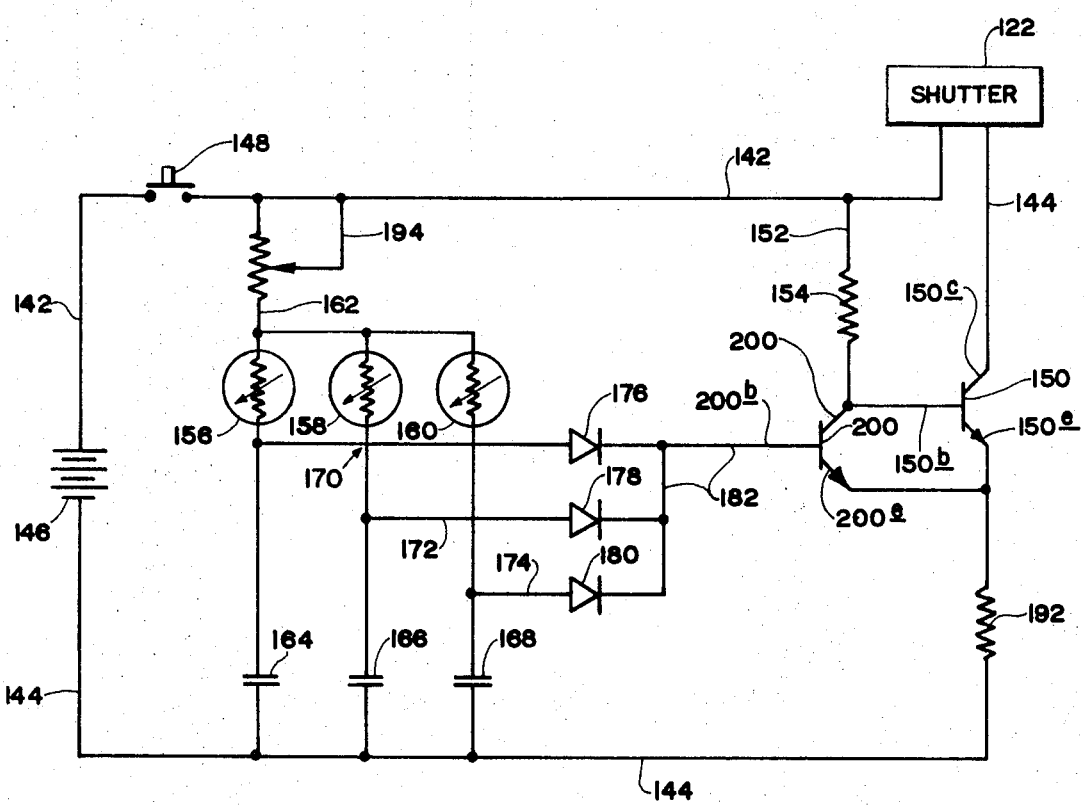
FIG. 3 is an electrical diagram of an alternate embodiment of an exposure control system according to the present invention.

The light-sensing and exposure interval timing network of the invention may be utilized with a variety of triggering systems. One of these alternate techniques is illustrated in FIG. 3. Inasmuch as the same photosensing and exposure interval timing network is utilized in the second embodiment as has been described in the first embodiment, the components of the circuit are provided corresponding numeration but as a 100 series. Similar to the earlier embodiment, the solenoid of a shutter mechanism indicated at 122 is energized to open a simple aperture arrangement through leads 142 and 144. These leads, in turn, are connected with a power supply as indicated by a battery at 146. Shutter arrangement 122 is opened or energized upon the closure of switch 148 which simultaneously causes a forward biasing of transistor 150 through line 152 in base resistor 154. As in the earlier embodiment, the shutter is held open until the R-C timing network functions to remove the forward bias from transistor 150.

The exposure interval timing network is shown to comprise three branches, each having a photoconductor as at 156, 158 and 160 coupled in charging relationship respectively with capacitors 164, 166 and 168. The photoconductors 156 to 160 are lined within the document duplicating device so as to detect discrete regions of the illuminated document. Resistances evolved in the photoconductors will establish the rate of charge of their associated capacitors and the resultant voltages will be present at diodes 176 through 180. As discussed in connection with FIG. 2, that photosensing branch having the most rapid voltage rise characteristic will affect its respective diode such as to cause a back biasing of the remaining diodes of the network. This back biasing function serves to isolate the remaining branches from the circuit. An exposure interval for the duplicating device is derived as the length of time required for the selected branch to reach a voltage sufficient to gate a transistor 200 to a forwardly biased status. In the present embodiment, transistor 200 will be seen to be coupled with transistor 150 to form a variety of Schmitt trigger. The forward biasing of transistor 200 will cause the removal of a forward bias at transistor 150 and deenergize the shutter mechanism 122. A resistor 192 is inserted in the common emitter path of the Schmitt trigger for purposes of providing a regenerative effect.

A variable resistor is inserted above the photosensing and exposure interval timing network at 194 for adjusting the responsiveness of the exposure timing branches.

From the foregoing discussion it may be seen that the circuitry of the invention provides not only an exposure interval timing system but also an intimately associated light value selection arrangement. This functional combination is provided with very few components in complement with a simplified shutter arrangement. It will be apparent that the number of branches incorporated within the photosensing and interval timing network may be varied to suit individual design requirements. Further, those skilled in the art will recognize that the selected output signal of the photosensing network may be used to provide exposure valve adjustments other than exposure interval timing as described.

Since certain changes may be made in the above system and apparatus without departing from the scope of the invention, it is intended that all matter contained in the above description or shown in the accompanying drawings shall be interpreted as illustrative and not in a limiting sense.

I claim:

1. Apparatus for controlling intervals of photographic exposure in accordance with the brightest portion of an illuminated object comprising:

shutter means operable to control the interval of said photographic exposure;

actuator means for opening said shutter means to initiate an exposure;

a timing network having a plurality of branches connected in parallel and arranged respectively for the photometric evaluation of selected regions of said illuminated object, each said branch including an element having an electrical characteristic variable in relation to the brightness of at least one said selected region and producing an output in response to the said initiation of exposure which changes with time in a manner functionally dependent upon said variable electrical characteristic;

discrete unilaterally conductive means coupled with each said branch output and interconnected to form a selector circuit for conveying only the said output representing a photometric evaluation of the said region of highest brightness; and trigger means responsive to the output of said selector circuit for closing said shutter means when said output reaches a preselected trigger level.

2. Apparatus in accordance with claim 1 wherein each said element of said timing network branch is a light dependent resistor arranged for exposure to light from at least one said region and having a resistance value varying inversely with the intensity of light incident thereon.

3. Apparatus in accordance with claim 1 wherein said element of said timing network branch is a light dependent resistor whose resistance values vary inversely with the magnitude of said selected region brightness.

4. Apparatus in accordance with claim 3 wherein each said timing network branch further includes capacitor means, the current through which changes in response to said initiation of exposure with a time constant dependent on at least the resistance of said light dependent resistor.

5. Apparatus in accordance with claim 1 including a manually adjustable variable resistance means coupled with said timing network for adjusting the output response characteristic of the network.

6. Apparatus in accordance with claim 1 wherein said unilaterally conductive means are mutually interconnected in a manner wherein that coupled with the said branch output representing a photometric evaluation of said region having highest brightness functions to isolate the outputs presented from the remaining branches.

7. Apparatus in accordance with claim 6 wherein each said unilaterally conductive means is a diode coupled for conductive response with said branch output.

8. Apparatus in accordance with claim 7 wherein said branch coupled diodes are mutually interconnected so as to permit a forward biasing only of that diode responding to the branch output of highest magnitude.

9. Apparatus in accordance with claim 1 wherein each said branch output is present as a voltage having a variable and rising value; and said selector circuit is arranged to effect a conveyance of that branch output having the highest rate of voltage rise.

10. Apparatus for controlling intervals of photographic exposure in accordance with the brightest portion of an illuminated object comprising:

shutter means operable to control the interval of said photographic exposure;

actuator means for opening said shutter means to initiate an exposure;

a timing network having a plurality of branches connected in parallel and arranged respectively for the photometric evaluation of selected regions of said illuminated object, each said branch including an element having an electrical characteristic variable in relation to the brightness of at least one said selected region and producing an output in response to the said initiation of exposure, said output being present as a time variable voltage having a rising value functionally dependent upon said variable electrical characteristic;

discrete unilaterally conductive means coupled with each said branch output and interconnected to form a selector circuit for conveying only the said output representing that branch output having the highest rate of voltage rise; and trigger means including a field effect transistor conductively responsive to the output of said selector circuit for closing said shutter means when said output reaches a preselected trigger level.

11. Apparatus in accordance with claim 10 wherein said trigger means further includes transistor means coupled for conductive response with said field effect transistor and operative to conduct in the absence of a said output at said trigger level.

12. Apparatus for controlling intervals of photographic exposure in accordance with the brightest portion of an illuminated object comprising:

shutter means for controlling said photographic exposure;

actuator means for opening said shutter means to initiate an exposure;

a timing network having a plurality of branches connected in parallel and arranged for the photometric evaluation of select regions of said illuminated object, each said branch including at least one light-dependent resistor exposed to light from at least one said region and having a resistance value dependent upon the intensity of light incident thereon, each said branch further including capacitor means, the current through which changes in response to initiation of exposure with a time constant dependent on at least the resistance of said light-dependent resistor, each said branch producing an output in response to initiation of exposure which changes with time in a manner functionally dependent on said resistance of said light-dependent resistor and hence upon the brightness of said region;

discrete unilaterally conductive means coupled with each said branch output and interconnected to form a selector circuit for conveying only the said output of predominant potential and hence representative of the said region of highest brightness; and trigger means responsive to the output of said selector circuit for closing said shutter means when said output reaches a preselected trigger level.

13. Apparatus in accordance with claim 12 including manually adjustable variable resistance means coupled with said timing network for adjusting the output response characteristic of the network.

14. Apparatus in accordance with claim 12 wherein said unilaterally conductive means are mutually interconnected in a manner wherein that coupled with the said branch output representing a photometric evaluation of said region having highest brightness functions to isolate the outputs presented from the remaining branches.

15. Apparatus in accordance with claim 14 wherein each said unilaterally conductive means is a diode coupled for conductive response with said branch output.

16. Apparatus in accordance with claim 15 wherein said branch coupled diodes are mutually interconnected so as to permit a forward biasing only of that diode responding to the branch output of highest magnitude.

17. Apparatus in accordance with claim 12 wherein each said branch output is present as voltage having a variable and rising value; and said selector circuit is arranged to effect a conveyance of that branch output having the highest rate of voltage rise.

18. Apparatus for controlling intervals of photographic exposure in accordance with the brightest portion of an illuminated object comprising:

shutter means for controlling said photographic exposure;

actuator means for opening said shutter means to initiate an exposure;

a timing network having a plurality of branches connected in parallel and arranged for the photometric evaluation of select regions of said illuminated object, each said branch including at least one light-dependent resistor exposed to light from at least one said region and having a resistance value dependent upon the intensity of light incident thereon, each said branch further including capacitor means, the current through which changes in response to initiation of exposure with a time constant dependent on at least the resistance of said light-dependent resistor, each said branch producing an output in response to initiation of exposure which is present as a time variable rising voltage functionally dependent on said resistance of said light-dependent resistor and hence upon the brightness of said region;

discrete unilaterally conductive means coupled with each said branch output and interconnected to form a selector circuit for conveying only the said output having the highest rate of voltage rise and hence representative of the said region of highest brightness; and trigger means including a field effect transistor conductively responsive to the output of said selector circuit for closing said shutter means when said output reaches a preselected trigger level.

19. Apparatus in accordance with claim 18 wherein said trigger means further includes transistor means coupled for conductive response with said field effect transistor and operative to conduct in the absence of a said output at said trigger level.